US008402440B2

(12) United States Patent
Sankaranarayanan et al.

(10) Patent No.: US 8,402,440 B2
(45) Date of Patent: Mar. 19, 2013

(54) PROGRAM VERIFICATION THROUGH SYMBOLIC ENUMERATION OF CONTROL PATH PROGRAMS

(75) Inventors: Sriram Sankaranarayanan, Plainsboro, NJ (US); Franjo Ivancic, Princeton, NJ (US); William R Harris, Madison, WI (US); Aarti Gupta, Princeton, NJ (US); Gogul Balakrishnan, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1058 days.

(21) Appl. No.: 12/393,500

(22) Filed: Feb. 26, 2009

(65) Prior Publication Data

US 2010/0005454 A1    Jan. 7, 2010

Related U.S. Application Data

(60) Provisional application No. 61/078,565, filed on Jul. 7, 2008, provisional application No. 61/147,842, filed on Jan. 28, 2009, provisional application No. 61/144,228, filed on Jan. 13, 2009.

(51) Int. Cl.
*G06F 9/44* (2006.01)
(52) U.S. Cl. ......... 717/126; 717/124; 717/130; 717/131
(58) Field of Classification Search .................. 717/126
See application file for complete search history.

(56) References Cited

U.S. PATENT DOCUMENTS

| | | | | |
|---|---|---|---|---|
| 5,263,127 A * | 11/1993 | Barabash et al. | ............... | 706/48 |
| 5,353,385 A * | 10/1994 | Tano et al. | ....................... | 706/48 |
| 6,526,572 B1 * | 2/2003 | Brauch et al. | ................. | 717/154 |
| 6,640,317 B1 * | 10/2003 | Snow | ............................ | 714/38.1 |
| 6,938,186 B2 * | 8/2005 | Das et al. | ...................... | 714/38.1 |
| 7,089,542 B2 * | 8/2006 | Brand et al. | ..................... | 717/143 |
| 7,389,501 B1 * | 6/2008 | Farouki et al. | ................ | 717/152 |
| 7,395,529 B1 * | 7/2008 | Stanton et al. | ................ | 717/131 |
| 7,469,403 B2 * | 12/2008 | Choi et al. | ..................... | 717/127 |
| 7,584,455 B2 * | 9/2009 | Ball | ............................... | 717/124 |
| 7,797,687 B2 * | 9/2010 | Tillmann et al. | ............... | 717/131 |
| 7,926,043 B2 * | 4/2011 | Vaswani et al. | ............... | 717/130 |
| 8,046,746 B2 * | 10/2011 | Tillmann et al. | .............. | 717/133 |
| 8,060,871 B2 * | 11/2011 | Bernabeu-Auban et al. | . . | 717/174 |
| 2004/0117772 A1 * | 6/2004 | Brand et al. | ..................... | 717/132 |
| 2005/0229044 A1 * | 10/2005 | Ball | ................................ | 714/38 |
| 2007/0016894 A1 * | 1/2007 | Sreedhar | ........................ | 717/131 |
| 2007/0033576 A1 * | 2/2007 | Tillmann et al. | .............. | 717/124 |
| 2007/0143742 A1 * | 6/2007 | Kahlon et al. | ................. | 717/124 |
| 2008/0082968 A1 * | 4/2008 | Chang et al. | .................. | 717/128 |
| 2008/0082969 A1 * | 4/2008 | Agha et al. | ..................... | 717/130 |
| 2008/0222614 A1 * | 9/2008 | Chilimbi et al. | .............. | 717/130 |
| 2008/0256518 A1 * | 10/2008 | Aoshima et al. | .............. | 717/127 |
| 2008/0276228 A1 * | 11/2008 | Sreedhar | ....................... | 717/131 |

(Continued)

OTHER PUBLICATIONS

Dirk Beyer, Thomas A. Henzinger, Rupak Majumdar, and Andrey Rybalchenko. 2007. Path invariants. SIGPLAN Not. 42, 6 (Jun. 2007), 300-309. DOI=10.1145/1273442.1250769 http://doi.acm.org/10.1145/1273442.1250769.*

(Continued)

*Primary Examiner* — Wei Zhen
*Assistant Examiner* — Matthew Brophy
(74) *Attorney, Agent, or Firm* — Joseph Kolodka; Bao Tran

(57) ABSTRACT

Systems and methods are disclosed to verify a program by symbolically enumerating path programs; verifying each path program to determine if the path program is correct or leads to a violation of a correctness property; determining a conflict set from the path program if the path program is proved correct; using the conflict set to avoid enumerating other related path programs that are also correct.

26 Claims, 6 Drawing Sheets

U.S. PATENT DOCUMENTS

2009/0089759 A1* 4/2009 Rajan et al. ............... 717/126
2009/0265692 A1* 10/2009 Godefroid et al. ............ 717/128

OTHER PUBLICATIONS

B. Aminof, T. Ball, and O. Kupferman. Reasoning about systems with transition fairness. In Proc. LPAR, LNCS 3452,pp. 194-208. Springer, 2004.*

Aaron Tomb, Guillaume Brat, and Willem Visser. 2007. Variably interprocedural program analysis for runtime error detection. In Proceedings of the 2007 international symposium on Software testing and analysis (ISSTA '07). ACM, New York, NY, USA, 97-107. DOI=10.1145/1273463.1273478 http://doi.acm.org/10.1145/1273463.1273478.*

Alessandro Cimatti, Marco Roveri, Viktor Schuppan, and Stefano Tonetta. 2007. Boolean abstraction for temporal logic satisfiability. In Proceedings of the 19th international conference on Computer aided verification (CAV'07), Werner Damm and Holger Hermanns (Eds.). Springer-Verlag, Berlin, Heidelberg, 532-546.*

Allen Goldberg, T. C. Wang, and David Zimmerman. 1994. Applications of feasible path analysis to program testing. In Proceedings of the 1994 ACM SIGSOFT international symposium.*

Dirk Beyer, Thomas A. Henzinger, Rupak Majumdar, Andrey Rybalchenko: Path invariants. In Proceedings of the International Conference on Programming Language Design and Implementation (PLDI), ACM Press, 2007, pp. 300-309.

Kenneth L. McMillan: Lazy Abstraction with Interpolants. In Proceedings of the International Conference on Computer Aided Verification (CAV), Springer, 2006, pp. 123-136.

Koushik Sen, Darko Marinov, and Gul Agha: CUTE: a concolic unit testing engine for C, In Proceedings of the International Symposium on Foundations of Software Engineering, ACM press, pp. 263-272, 2005.

Andreas Holzer, Christian Schallhart, Michael Tautschnig, and Helmut Veith. Query-Driven Program Testing. In Proceedings of the International Conference on Verification, Model Checking, and Abstract Interpretation (VMCAI), 2009, Springer.

Matthias Heizmann, Jochen Hoenicke and Andreas Podelski: Refinement of Trace Abstraction. In Proceedings of the International Symposium on Static Analysis (SAS), Springer, 2009, pp. 69-85.

* cited by examiner

```
0: proc. foo (int * p, int c)
1:      int j=0, flag, * y = p;
2:      if ( p != NULL )
3:          flag := 1;
4:      else
5:          flag := 0;
6:      if ( c < 0 )
7:          c := 10;
8:      for( i=0; i < c ; ++i)
9:          j -;
10:     end-for
11:     if (flag > 0)
12:         ASSERT ( y != NULL)
14:         /*- deref of ptr y -*/
```

```
    proc. allocFree ( int N )
1:  int i, *a
2:  if ( n ≤ 0) return
3:  a := alloc(n)
    ...
4:  if (...)
5:      a := NULL
    ...
6:  i := 0
7:  while(i < n)
8:      a[i] := 0
9:      i := i +1
10: return
```

PROGRAM VERIFICATION THROUGH SYMBOLIC ENUMERATION OF CONTROL PATH PROGRAMS

This application claims priority to U.S. Provisional Application Ser. Nos. 61/078,565, filed Jul. 7, 2008, 61/147,842 filed Jan. 28, 2009 and 61/144,288 filed Jan. 13, 2009, the content of which is incorporated by reference.

BACKGROUND

This application relates to methods for program verification through symbolic enumeration of control path programs.

Symbolic execution has been proposed as a method for generalizing dynamic testing. Initial work focused on generating test sets with better basic block coverage, not necessarily proving satisfiability of program assertions. Recently, work has been done towards using a symbolic execution engine in the refinement step of a predicate abstraction-based model checker. Conventional symbolic execution-based tools employ a combination of concrete and symbolic execution to systematically explore the paths of a given program. The symbolic execution of a given program path computes a set of constraints whose solutions provide inputs for executions along the path. Such inputs yield useful test cases for the program in order to discover potential bugs and to maximize code coverage. The unsatisfiability of the constraints computed along a path indicates the (semantic) unfeasibility of the chosen path. Symbolic execution approaches have been shown to be effective for test generation in order to cover large portions of the program and discover useful bugs in the process. However, the path explosion problem, wherein the large number of program paths to be explored results in numerous expensive satisfiability checks, frequently limits its applicability in practice. A significant fraction of the paths that contribute to the path explosion problem tends to be infeasible. Such paths do not contribute to the overall coverage goals, or lead to useful bugs. Therefore, they are mostly ignored by existing approaches. Secondly, techniques based on symbolic execution expose potential bugs in the programs but not necessarily indicate the absence of such bugs due to the incompleteness of the symbolic execution.

Path programs are syntactic paths in the MSCC graph between the start node and a given property node. They represent a set of syntactic paths through the original program, traversing the same subset of edges but varying in the number of iterations of loops/recurrences encountered in the path. Existing program analysis techniques are mostly path insensitive. This makes the results of the analysis imprecise, leading to problems such as false alarms. Path insensitivity is an important reason for failure to prove properties by static analysis techniques. A completely path sensitive analysis, however, does not scale. Many approaches have been proposed for path sensitive program analysis, including ESP, trace partitioning, elaborations, and others based on disjunctive completion. Significantly, the approaches detailed above allow partial path-sensitivity on top of an underlying framework for path-insensitive analysis. However, conventional approaches typically use heuristics to control the trade-off between performing a join operation as opposed to a logical disjunction at the merge points in the control flow graph. The performance of such heuristics can be highly variable depending on the type of the program being analyzed.

SUMMARY

Systems and methods are disclosed to verify a program by symbolically enumerating path programs; verifying each path program to determine if the path program is correct or leads to a violation of a correctness property; determining a conflict set from the path program if the path program is proved correct; using the conflict set to avoid enumerating other related path programs that are also correct.

In another aspect, a method to verify a program includes symbolically enumerating path programs; verifying each path program to determine correctness with respect to a property; determining a conflict set from the path program if proven correct; and using the conflict set to avoid enumerating related path programs that are correct.

In yet another aspect, a method to verify a program, comprising: enumerating depth bounded path programs; verifying each path program to determine correctness with respect to a property; determining a conflict set from the path program if proven correct; and using the conflict set to avoid verification of related path programs that are also correct.

In one embodiment, starting from a SAT formula $\phi_0$ that encodes all the path programs in the CFG, the system extracts a single path program as a solution to the current formula $\phi_i$. If the given property is proven in this path program using abstract interpretation, the system computes a minimal subset of edges in the path that are responsible for the proof. As a result, all the other path programs that traverse the same subset of edges are guaranteed to also satisfy the property in question. Such paths need not be enumerated. The subset of edges that constitute the proof of a single path program is added as a blocking clause to the SAT formula $\phi_i$ to obtain the next SAT formula. If, on the other hand, abstract interpretation is unable to prove the property in the given path program, the path is presented as a potential witness or attempt to concretize along the path using more powerful model-checking techniques.

In another aspect, systems and methods are disclosed to verify a program by encoding path programs as a Boolean SAT formula with constraints; generating a Boolean SAT solver for the constraints; generating a path program instantiation from the Boolean SAT formula; applying a proof-producing static analysis to the path program instantiation; determining a conflict set from a flow analysis and one or more UNSAT cores; and applying a SAT Modulo Theory (SMT) solver on the conflict set computation.

In yet another aspect, systems and methods are disclosed for processing a computer program by extracting one or more unsatisfiable cores from one or more path constraints during a symbolic execution of the program; and mapping one or more symbolic constraints in the unsatisfiable cores to an infeasible edge conflict sequence in the computer program.

Advantages of the preferred embodiments may include one or more of the following. The system supports the removal of checks for many infeasible paths through matches with previously derived conflict sequences. The system also enables the sound handling of loops and the infeasible sequences arising out of loop iterations in the symbolic execution. The system also supports an extraction of unsatisfiable cores from path constraints during symbolic execution and the mapping of symbolic constraints in these cores to program edges to derive conflict sequences. Abstract interpretation/static analysis techniques can also be used to generate unsatisfiable cores for loops.

DESCRIPTION

Figure 1:
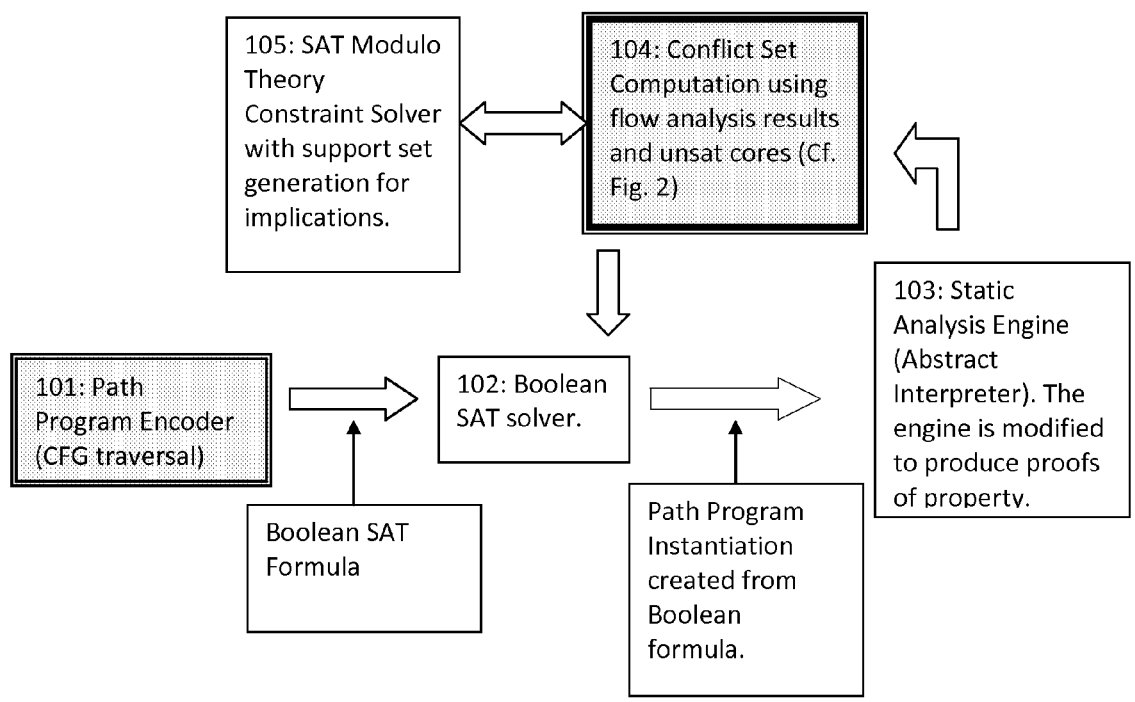
FIG. 1 shows a path-sensitive program analysis process that enumerates control path programs.

FIG. 1 shows a path-sensitive program analysis process that enumerates control path programs. Path programs are formed by a subset of edges in the control flow graphs. Each path program represents a set of executions, all of which traverse the same CFG path, but vary in the number of loop iterations. The enumeration of path programs is guided by a SAT formula whose solutions represent the set of path programs to be explored.

Referring now to FIG. 1, software to be tested is provided to a path program encoder 101 which encodes all path programs as a SAT formula. The encoding process consists of applying the definitions of a path program to the program input to the process. The encoding produces a Boolean SAT formula. Next, a Boolean SAT solver 102 is generated for the constraints produced by the encoder 101. The SAT-solver encodes and enumerates efficiently over all possible path programs. The system applies a SAT solver only for path program enumeration, on the CFG and rely on abstract interpretation for determining path program feasibility.

A path program instantiation is created from Boolean formula and provided to a proof-producing and sound static analyzer 103. Next, the static analysis proof is provided to a conflict set computation unit 104. Block 104 is explained in more detail in FIG. 2. The conflict set computation is then provided to a SAT Modulo Theory (SMT) solver 105 with support set and unsatisfiable core computation.

For each path program, an abstract interpretation is performed to prove the property of interest along the path. A proof of the property yields conflict sets consisting of a subset of the statements in the path program. The conflict sets represent sufficient reasons for the property to hold. Furthermore, any other compatible path program that visits the edges present in the conflict set is also guaranteed to satisfy the property. The system adds blocking clauses derived from the conflict set back to the SAT formula in order to avoid the enumeration of compatible path programs.

The system provides a simpler and more direct approach to path-sensitivity based on the symbolic enumeration of path programs. The maximal strongly connected component (MSCC) decomposition of a CFG is obtained by compacting loops and recurrences in the program into components. Path programs are syntactic paths in the MSCC graph between the start node and a given property node. They represent a set of syntactic paths through the original program, traversing the same subset of edges but varying in the number of iterations of loops/recurrences encountered in the path. The operations include symbolically enumerating all the (finitely many) path programs from the start node to a property node and verifying the property over each enumerated program using path-insensitive static analysis. The widening and narrowing operators are used to treat loops conservatively. At the termination of the analysis, the set of path programs that cannot be proven by the abstract interpreter are summarized and presented to the user or to a more complete verification procedure as potential witnesses. However, the number of path programs between the start node and given target node can be exponential in the size of the program. As a result, an explicit enumeration is impractical. The system addresses this in two ways. First, conflict sets are learned from the proof of a single path program from which the system learns and reuses in order to conclude a proof for other related path programs. Second, a SAT encoding of the set of path programs keeps track of the paths that remain to be explored in the process.

Figure 2:
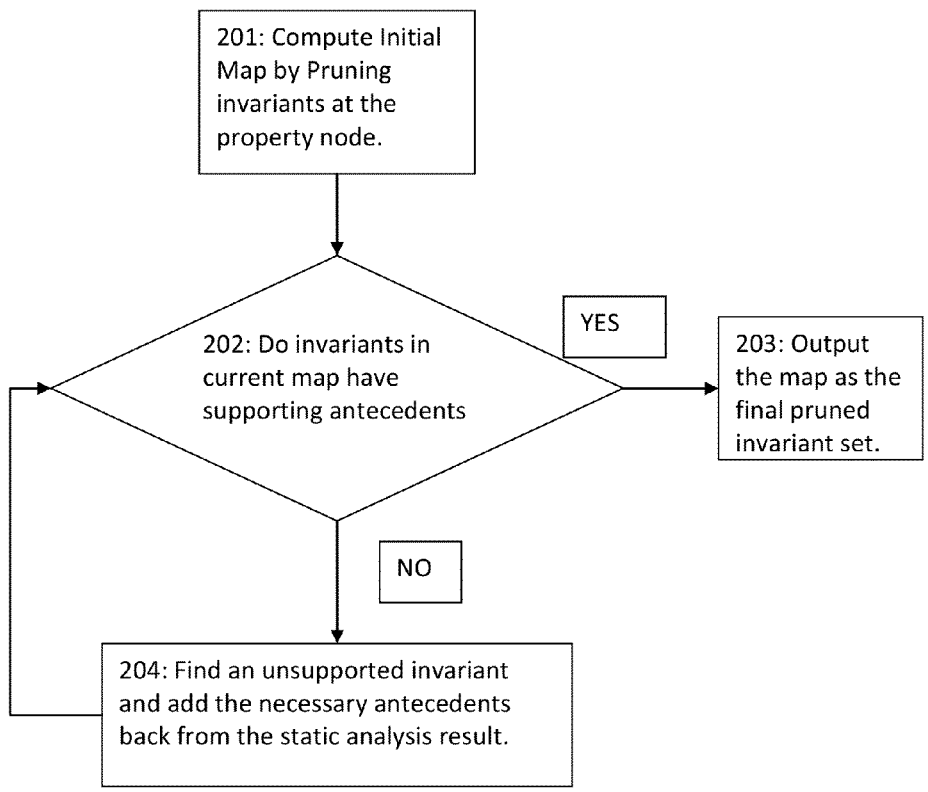
FIG. 2 shows in more detail the conflict set determination process.

FIG. 2 shows in more detail the conflict set determination process. Block 201 determines an Initial Map by pruning invariants at the property node. The process checks if invariants in the current map have supporting antecedents in block 202. If so, the process outputs the map as the final pruned invariant set in block 203. Alternatively, block 204 locates an unsupported invariant and adds necessary antecedents back from the static analysis result. Block 204 then loops back to block 202 to check for invariants.

Figure 3:
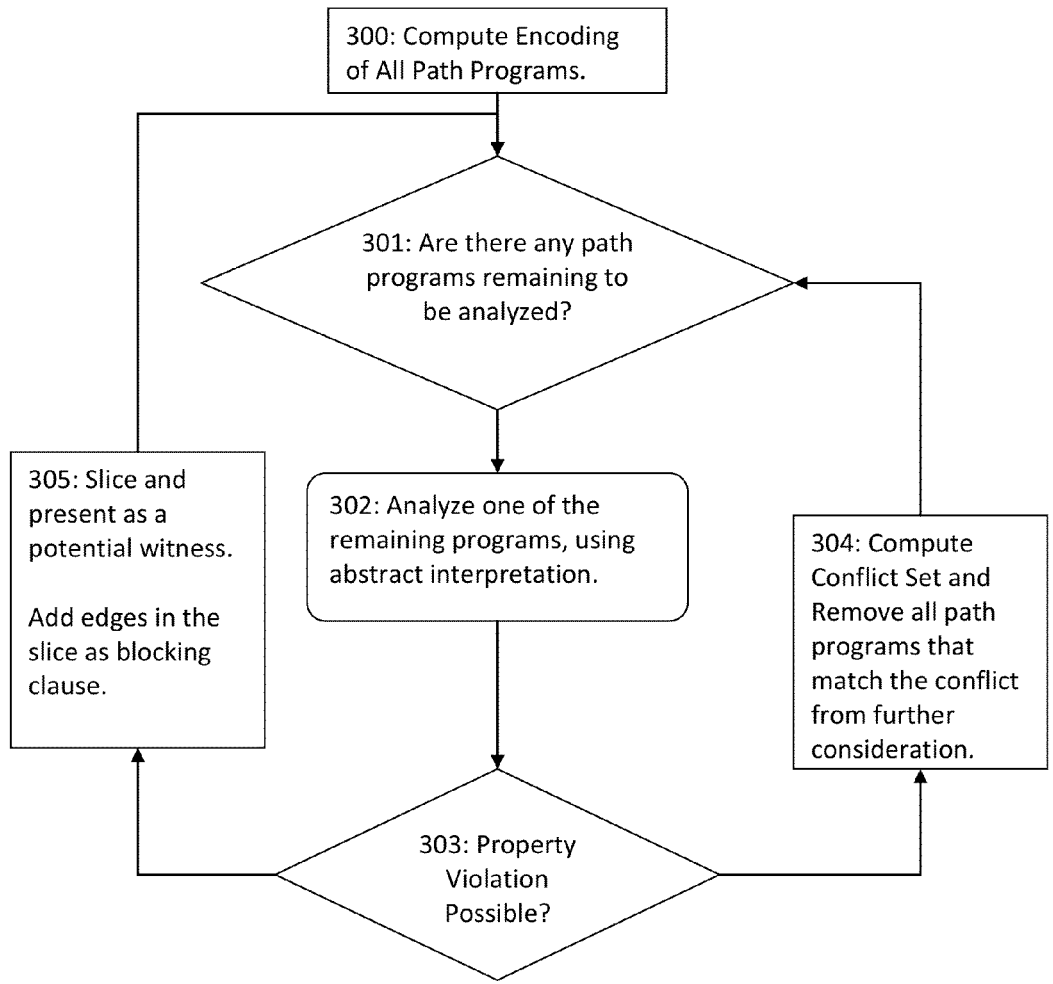
FIG. 3 shows an exemplary process 300 to determine the encoding for all path programs.

Referring now to FIG. 3, an exemplary process 300 is shown for determining the encoding for all path programs. The path encoding is performed by a control flow graph traversal. The result is a Boolean formula over variables $y\_1, \ldots, y\_n$ that correspond to the control flow graph edges $e\_1, \ldots e\_n$. In block 301, the process checks if any paths remain to be analyzed. This is achieved by means of a SAT-isfiability check over the SAT formula that encodes the remaining paths to be explored. Next, in block 302, the process analyzes one of the remaining programs using abstract interpretation. The analysis over abstract interpretation is a standard procedure that can be performed by any of the existing abstract interpreters including F-Soft. Next, in block 303, the process checks for possible property violations. The check for a proof is direct from the output of the abstract interpretation.

If violations are possible, in block 304, the process computes the conflict set and removes all path programs that match the conflict from further consideration. Conflict sets are a subset of edges in the path program that are responsible for the property proofs. Since it is guaranteed that any other path program that visits the same subset of nodes will also satisfy the property, the system can remove all path programs that visit the conflict set. In terms of SAT encoding, the conflict set is added as a blocking clause. Alternatively, in block 305, the witnesses can be sliced and presented to the user. The removal of the path program is again performed as in (103) by conflict clauses.

For convenience, the following discussion focuses on programs without any procedure calls. Control-flow graphs (CFG) are used to represent programs.

DEFINITION (CONTROL FLOW GRAPHS)

A CFG $\Pi$ is a tuple $<N, E, V, \rho, n_0, n_e>$, wherein N is a set of nodes, $E \subset N \times N$ is a set of edges, $n_0 \in N$ is an initial location, $n_e \in N$ is an exit location, and V is a set of typed (global) program variables. Each edge $e \in E$ is labeled by a transition relation $\rho_e(V, V')$, a first-order assertion over current-state variables V and next-state variables denoted by V'. A (concrete) execution through the CFG starts at the entry block with arbitrary initial values to the program variables, and terminates when it reaches the exit block.

DEFINITION (PROPERTY)

Figure 4A:
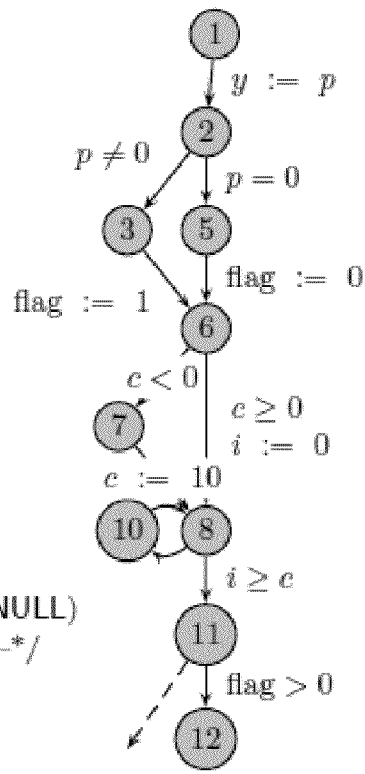
FIG. 4A shows an exemplary imperative program along with its CFG representation.

A property to be verified is specified as a program assertion n, ψ consists of a node n in the CFG along with an assertion ψ over the program variables, requiring that ψ hold whenever control reaches the node n. FIG. 4 shows an example control flow graph of a program over integer-valued variables i, j, c, flag and pointer variables y, p.

A program assertion $\Psi$: $n_{12}$, (y≠0) requires that the value of y not equal zero when control reaches $n_{12}$. In this case, the assertion holds true on all the program executions. However, a path-insensitive abstract interpretation of the program using the interval domain is unable to prove the property due to the join operation at line 5, wherein the correlation between the variables is lost.

MSCC Decomposition

DEFINITION (MAXIMAL STRONGLY CONNECTED COMPONENTS)

Given a graph G:<N, E>, a strongly connected component (SCC) consists of a subset of nodes C ⊂ N such that for each $n_1$, $n_2 \in$ C, there exists a path from $n_1$ to $n_2$ and vice-versa. A strongly connected component C is maximal (MSCC) iff no strict superset of C is a strongly connected component. Given a graph G, its MSCC-decomposition consists of MSCCs $C_1, \ldots, C_n$ such that $C_i \cap C_j = \emptyset$ and $C_1 \cup C_2 \cup \ldots \cup C_n = N$. The MSCC decomposition of a graph can be computed in time linear to the size of the graph using a standard technique based on a DFS traversal. Furthermore, we may define a graph $G_D$ over the MSCCs of G over the vertex set $N(G_D):\{C_1, \ldots, C_m\}$ consisting of the MSCCs of the graph G and edges connecting MSCCs as follows:

$$E(G_D):\{((C_i, C_j)|i \neq j, \text{ and } (\exists n_i \in C_i, n_j \in C_j)(n_i, n_j) \in E(G)\}.$$

The MSCC decomposition $G_D$ of a graph G is a directed, acyclic graph. The MSCC decomposition of the CFG in FIG. 4 yields one non-trivial MSCC consisting of the nodes {8,10}. All the other nodes appear by themselves as MSCCs.

Let G:N, E be the CFG obtained from a program ⊓. Its MSCC decomposition $G_D$ compresses loops (and recurrences) in the CFG into a single representative node. Nodes in the CFG G that do not belong to loops appear as singleton sets in the decomposition $G_D$.

Next, path programs are discussed.

DEFINITION (PATH PROGRAM)

A path program $\pi:n_0 \hat{1} n$ is a simple path in $G_D$ from the initial node $n_0$ to a given node n. path program $\pi$ naturally corresponds to a subset of nodes and edges in G, obtained as the union of the MSCCs traversed by $\pi$.

An abstract interpretation framework is used to compute fixed points over program fragments that may traverse cycles in the program arbitrarily many times. If Σ denotes the universe of concrete program states, an abstract domain consists of a lattice L, $\sqsubseteq, \sqcup, \sqcap$ along with the abstraction map α: $2^\Sigma \mapsto$ L, and the concretization map γ:L $\mapsto 2^\Sigma$. Each abstract object a∈L is associated with a set of states γ(a) ⊂ Σ. The maps α and γ together provide a Galois Connection between the concrete lattice $2^\Sigma$ and the abstract lattice L.

Next, a flow sensitive map is discussed. A flow-sensitive map η:B $\mapsto$ L, associates each node b in the CFG with an abstract object η(b)∈L.

In a Fixed-Point Map (Inductive Map), a map η is a fixed point (inductive invariant) iff η($n_0$)=T and at each location b and for each outgoing edge e: b→b', the following containment holds:

$$\forall e:(a \to b) \in E) \gamma(\eta(a))[V] \hat{} \rho(e)[V, V'] \, \mathbb{P} \, (\eta(b))$$
$$[V \mapsto V'].$$

A property n, φ for a program is proved iff there exists a fixed point η such that γ(η(n)) $\mathbb{P}$.

The goal of an abstract interpreter is to compute a fixed point flow sensitive map for given a program. This is achieved by starting with the initial map:

$$\eta^0(b): \begin{cases} T, & b = b_0, \\ \bot, & \text{otherwise.} \end{cases}$$

At each step, the process computes a new map $\eta^{i+1}$ iteratively from the map $\eta^i$ by applying the post-condition operation:

$$\eta^{i+1}(b): \begin{cases} T, & b = b_0, \\ \sqcup_{b' \to b} \, (\eta^i(b'), b' \to b). \end{cases}$$

The iteration is denoted as $\eta^{i+1} = L (\eta^i)$. Starting from the initial map $\eta^0$, the iteration is applied to produce a sequence of maps $\eta^1, \eta^2, \ldots$. The iteration is terminated whenever $\eta^{i+1}(b) \subseteq \eta^i(b)$, $\forall b \in B$. However, termination is not guaranteed, unless the lattice L satisfies the ascending chain condition. Therefore, the widening operator is used to guarantee convergence. Let $\eta^0, \eta^1, \ldots$ be a sequence of iterations. A widened iteration sequence $\phi^0, \phi^1, \ldots$ is computed using widening: $\phi^0 = \eta^0$, $\phi^{i+1} = \phi^i \eta^{i+1}$. Using the properties of the widening operator, it can be shown that the sequence $\phi^0, \phi^1, \ldots$, converges to a fixed point map in a finite number of steps.

The interval domain is a simple yet widely used abstract domain. Let X be a set of program variables. The interval lattice I(X) consists of intervals: $\hat{}_{x_i \in X} \, x_i \in$[l,u], wherein l, u∈∪{∞,−∞}, mapping each program variable to an interval of values. The detailed description of the abstract domain including basic domain operations are readily defined over intervals. However, the variable ranges which result from abstract interpretation on the interval domain are relatively imprecise because of the lack of relational information between variables. For instance, the interval x∈[10,15]^y∈E [4,15] does not state any formal relationship between the values of x and y. This is a serious limitation in practice.

Octagon Domain.

The octagon domain due to Miné consists of bounds on expressions of the form $\pm x_i \pm x_j 0$ for all pairs $x_i$, $x_j$ [20]. The focus on unit, two variable constraints gives rise to efficient representation as well as fast polynomial time algorithms for the domain operations. Furthermore, they improve upon interval analysis by computing weakly-relational invariants. The octagon domain provides some relational information among the variables by considering invariants involving expressions such as ±x±y with two variables and unit coefficients. On the other hand, this is inadequate in many situations wherein an invariant involving more than two variables and non-unit coefficients is required.

Polyhedral Domain.

Numerical domains such as Polyhedra, and restricted forms such as Symbolic Ranges, two variable polyhedra and so on, compute linear inequality invariants over the program variables. Together, they represent various levels of trade-off between the strength of the invariants against the complexity of the analysis.

F-Soft implements numerous abstract domains including intervals, octagons, symbolic ranges and polyhedra inside a partially path-sensitive abstract interpreter. The analysis uses these domains in combination or in succession to attempt to prove a property, each run of the analysis reusing the invariants obtained by the previous runs.

Path Program Enumeration

Let $\Pi$ be a control flow graph with a given property $\psi : n, \phi$ under verification. We first present a naive scheme for path program enumeration that simply enumerates the path programs one after another. This is improved by encoding the set of all path programs as a SAT formula and using blocking clauses to eliminate a large set of path programs in one step.

All-path enumeration considers all the syntactic paths in the CFG starting from the initial node $n_0$ and leading upto the property node n in turn. Each enumerated path is checked if a violation of the assertion $\phi$ may occur. However, all-path enumeration is bound to fail for most programs, since the number of paths is infinite for programs with loops, and secondly, checking the possibility of a violation of $\phi$ is undecidable over the paths. The system uses the following improvements over all-path enumeration:

1. The enumeration is performed over path programs obtained as simple paths from the MSCC decomposition $G_D$ of the CFG. Since $G_D$ is a DAG, the number of paths leading upto the node n in $G_D$ is finite.
2. The feasibility check for each path chosen and the associated property verification is performed using sound but incomplete abstract interpretation techniques. Such techniques can soundly detect paths that satisfy the property. However, they may suffer from the problem of false positives. I.e., if they detect violations of the property, such violations may be the result of false alarms due to the incompleteness in the abstract domain.
3. Finally, conflict clauses learned through the analysis of a single path program are used to prove the property for a set of related paths $\phi$. The enumeration scheme stores the set of paths symbolically to avoid enumeration of these related paths.

Path Program Enumeration

Let G denote the original CFG corresponding to a program $\Pi$ and $G_D$, its MSCC decomposition. Let n, $\phi$ be a property under verification. Let m be the MSCC containing n in the graph $G_D$ and $m_0$ be the MSCC containing the initial node $n_0$. A path $\pi_D$ in the graph $G_D$ program the initial node $m_0$ to the target node m represents an (infinite) set of paths in the graph G wherein each visit to a non-singleton MSCC in $G_D$ is substituted by its constituent nodes in G.

The overall verification scheme by path program enumeration is shown in the following pseudo-code to verify a property over a CFG by path enumeration.

```
Input: Π : Program CFG, ψ : (n, φ) assertion to be verified.
Result: Alarms : Set of possible path programs leading to violation.
begin
1    Compute MSCC decomposition G_D.
2    P := paths(G_D, n_0, n).  /* Symbolically encode all paths in G_D from
                                  n_0 to n */
3         while (P ≠ 0) do
4             Choose π ∈ P.
5             η := AbstractInterpret(π, n, φ)    /* Use static analysis over π */
6             if (η(n) |= φ) then                /* π cannot lead to violation */
7                 Q := extractConflict(π, η)    /* Compute conflict paths */
8                 P := P - Q
              else                              /* π may lead to violation */
                  /* Compute related violations using path slicing */
9                 S := extractPathSlice(π, n)
10                Alarms := Alarms ∪ S
11                P := P - S
end
```

The scheme does not yet address issues such as the actual representation of the set P and the various steps involved including the abstract interpretation, computing conflict paths and the path slicing for alarms. The verification proceeds by encoding the set P of all paths in the MSCC graph $G_D$ leading from $n_0$ to the property n. A symbolic encoding technique is used for achieving this step. For each selected path $\pi$, an abstract interpreter over a set of suitably chosen domains is used to compute a flow-sensitive map $\eta$ for each node appearing in the path $\pi$ (Line 5). Based on the result of the abstract interpreter at the target node, no violation may occur. In this case, the result of the abstract interpreter may be used to extract a set of paths $Q \subseteq P$ (Line 7) such that $\pi \in Q$ and no path in Q can lead to a violation of the property. On the other hand, if the abstract interpreter fails to prove the property, we use a path slicing technique on the path $\pi$ in order to extract a set of related paths S (Line 9) such that $\pi \in S$ and each path in S may lead to a possible violation. In practice, S is represented by a set of program statements that may be directly presented to the user as an alarm. The enumeration proceeds by removing paths in S from further consideration.

Analyzing Path Programs

Let $\pi$ be a path through $G_D$. Such a path gives rise to a subset $N_\pi$ of the nodes and $E_\pi$ of the edges in the CFG. Let $G_\pi$ represent the subset of the original CFG constructed by removing nodes and edges not appearing the path $\pi$. Let $\eta$: $N_\pi \mapsto 2^\Sigma$ be an inductive (fixed-point) map that associates each location $n \in N_\pi$ in the path $\pi$ with an invariant set $\eta(n)$, valid over all executions that do not visit nodes or traverse edges outside the sets $N_\pi$ and $E_\pi$, respectively. This map is computed by running an abstract interpreter over the CFG formed by the restricted node and edge sets respectively. By the soundness of the abstract interpretation, if $\eta(n) \subseteq \phi$, then all executions leading from $n_0$ to n along the nodes/edges in $\pi$ do not lead to a violation.

For example, consider the path $\pi$ $$1 \xrightarrow{y:=p} 2 \xrightarrow{p \neq 0} 3 \xrightarrow{flag:=1} 6 \xrightarrow{i:=0} \{8, 10\} \xrightarrow{i \geq c} 11 \xrightarrow{flag>0} 12$$

in the program from FIG. 4. A simple numerical domain abstract interpreter can compute the invariant (the entire map $\eta$ is not shown here)

$$\eta(12): y = p \wedge p \neq 0 \wedge i = c \wedge flag = 1,$$

at location 12. This invariant suffices to establish the property 12, $y \neq 0$ at this location, showing that the path(s) in question cannot lead to a violation.

On the other hand, a closer look at the invariant reveals that the edges $1 \to 2$ and $2 \to 3$ suffice to establish this invariant in the path. A related path $\xi$ such as $$1 \xrightarrow{y:=p} 2 \xrightarrow{p \neq 0} 3 \xrightarrow{flag:=1} 6 \xrightarrow{c<0} 7 \xrightarrow{i:=0} \{8, 10\} \xrightarrow{i \geq c} 11 \xrightarrow{flag>0} 12$$

that traverses the relevant edges and preserves reaching definitions for the variable y at line 12 also proves the property.

Given a path $\pi$ and the result $\eta$ of the abstract interpretation over $N_\pi$, $E_\pi$, a subset of nodes and edges is computed along the path that suffices to prove a given property n, $\phi$. This is achieved in two steps: (a) The map $\eta$ is generalized by iteratively pruning away the conjuncts from the invariant computed at each node, retaining a minimal subset that is sufficient to prove invariance. (b) Based on the result of the pruning, a set of nodes and edges that suffice to prove the property of interest is obtained.

Pruning Invariants.

A minimal support set is defined next. Let $Q: q_1, \ldots, q_m$ and q be first order assertions over program variables (possibly belonging to some theory such as linear arithmetic) such that $q_1 \wedge q_2 \wedge \ldots \wedge q_m \models q$ holds.

A subset $Q' \subseteq Q$ is said to support the inference $\wedge_{q_i \in Q} q_i \models q$ w.r.t the consequence q iff $\wedge_{q_j \in Q'} q_j \models q$. A support set $Q'$ is minimal iff no subset of $Q'$ can support Q.

In one example, assertions $q_1: i \geq j$, $q_2: j \geq k+1$, $q_3: i \geq k+1$, $q_4: k \geq 1$ together imply the assertion q: $i \geq 2$ in the theory of linear arithmetic over integers. The subset $\{q_1, q_2, q_4\}$ by itself suffices to establish q and is thus a minimal support set. The minimal support set is not unique. The set $\{q_3, q_4\}$ also forms a minimal support set for the implication.

Let $\eta$ be a fixed point computed using abstract interpretation that establishes a property n, $\phi$. Without loss of generality, it is assumed that the property n is a terminal node of the CFG $N_\pi$, $E_\pi$. As a result $\eta(n) \models \phi$. Starting with the property node n, let $\eta(n)$ be represented as a conjunctive assertion $q_1 \wedge \ldots \wedge q_m$. It follows that there exists a minimal support set $Q \subseteq q_1, \ldots, q_m$ that supports the implication $\eta(n) \models \phi$. Since $\eta$ is a fixed point, for every edge $e: n_1 \to n_2 \in E_\pi$, $$\eta(n_1)[V] \wedge \rho(e)[V, V'] \models \eta(n_2)[V'].$$

Let $\mu^0$ be the map obtained by modifying $\eta$ as follows:

$$\mu^0(m) = \begin{pmatrix} \eta(n) & m = n \\  & m \neq n \end{pmatrix}$$

In effect, the map $\mu_0: N_\pi \mapsto 2^\Sigma$ maps the property node n to the assertion $\eta(n)$ and all other nodes to. The map may not, in general, be an inductive fixed point map. It may fail the consecution property for the incoming edges to the node n. The system obtains an iterative series of maps $\mu^0, \ldots, \mu^N, \mu^{N+1}$ such that:

1. $\mu^i$ may not be inductive, for $i < N$.
2. $\mu^{N+1}$ is inductive, and proves the property n, $\phi$.
3. For each iterate $\mu^i$, and for each node m, the assertion $\mu^i(m)$ consists of a subset of conjuncts from $\eta(m)$. As a result $\eta(m) \models \mu^i(m)$.
4. Each successive map incorporates at least as many conjuncts from $\eta$ as the previous, I.e., $$(\forall i < j), (\forall m \in N_\pi) \mu^j(m) \models \mu^i(m).$$

Local Repair.

The failure of $\mu^i$ for $i < N$ to be an inductive invariant is handled by local repair. Local repair consists of adding conjuncts from $\eta(m)$ into $\mu^i(m)$ for each node m. Since $\mu^i$ is not inductive, let $a \to b$ be an edge in the CFG such that $(\mu^i(a), a \to b) \not\models \mu^i(b)$, causing $\mu^i$ not to be a fixed point. However, $$\eta(a)[V] \wedge \rho(e)[V, V'] \models \mu^i(b)[V'], \text{ and } \eta(b) \models \mu^i(b)$$

Let $Q_a$ be a minimal subset of conjuncts from $\eta(a)$ that supports the implication above. Local repair of $\mu^i(a)$ w.r.t $a \to b$ adds the conjuncts in the set $Q_a$ to $\mu^{i+1}(a)$ in order to minimally support the implication across the edge $a \to b$. This yields a new map $\mu^{i+1}$. Such a repair is always possible since $\eta(a)$ itself implies the invariant $\mu^i(b)$.

Let $\eta$ be a fixed point map and $\mu^0, \ldots, \mu^i, \ldots$ be a sequence of maps wherein $\mu^{i+1}$ is obtained from $\mu^i$ by local repair of some failing edge using assertions from $\eta$. This process converges when $\mu^i$ is inductive. The process of repeated local repair terminates in finitely many steps yielding a fixed point map $\mu$.

TABLE 2

Invariant maps $\eta$ and local repair iteration w.r.t the property 12, $y \neq 0$.

| n | $\eta(n)$ | $\mu^0(n)$ | $\mu^1(n)$ | $\mu^2(n)$ | ... $\mu^7(n)$ |
|---|---|---|---|---|---|
| 1 | true | true | true | true | ... true |
| 2 | y = p | true | true | true | ... y = p |
| 3 | y = p $\wedge$ p $\neq$ 0 | true | true | true | ... p $\neq$ 0 $\wedge$ y = p |
| 6 | $\eta(3) \wedge$ flag = 1 | true | true | true | ... p $\neq$ 0 $\wedge$ y = p |
| 8 | $\eta(6) \wedge$ c $\geq$ 0 $\wedge$ i $\leq$ c | true | true | p $\neq$ 0 $\wedge$ y = p | ... p $\neq$ 0 $\wedge$ y = p |
| 10 | $\eta(6) \wedge$ c $\geq$ 0 $\wedge$ i < c | true | true | p $\neq$ 0 $\wedge$ y = p | ... p $\neq$ 0 $\wedge$ y = p |
| 11 | $\eta(8) \wedge$ i = c | true | p $\neq$ 0 $\wedge$ y = p | $\mu^1(11)$ | ... p $\neq$ 0 $\wedge$ y = p |
| 12 | $\eta(11)$ | p $\neq$ 0 $\wedge$ y = p | $\mu^0(12)$ | $\mu^0(12)$ | ... p $\neq$ 0 $\wedge$ y = p |

Consider the path $\pi$ from path-running-example recalled below:

$$1 \xrightarrow{y:=p} 2 \xrightarrow{p \neq 0} 3 \xrightarrow{flag:=1} 6 \xrightarrow{i:=0} \{8, 10\} \xrightarrow{i \geq c} 11 \xrightarrow{flag>0} 12$$

Abstract interpretation using a set of standard numerical domains yields the map η as shown in invariant-map-example. The property y≠0 at line 12 is minimally supported by the conjuncts p≠0^y=p in η(12). This leads us to form the initial map $\mu^0$. This map is not inductive due to the failing edge 11→12. Therefore, a local repair yields the map $\mu^1$. Subsequent local repair iterations propagate the supporting conjuncts towards the beginning of the path μ. The iteration converges in 7 steps yielding the final map $\mu^7$.

Using a repeated process of local repair, the system extracts a minimal invariant map that is inductive and continues to establish the property of interest. This map is then used to extract the minimal set of conflict edges that support the proof of the property.

Conflict Edges.

Let η be a fixed point for a path π establishing a property ψ and let μ be an inductive map for ψ obtained using the local repair iteration. The conflict edges $C_\pi$ consists of a subset of $E_\pi$ of relevant edges (defined below) that are sufficient for the proof of ψ. Such a set is obtained by collecting relevant assignment edges as well as conditions.

Next, conflict edges are discussed.

DEFINITION (CONFLICT EDGES)

An assignment edge $$e: a \xrightarrow{x} b$$

is relevant w.r.t. μ iff the consecution condition (μ(a), e)⊨(b) ceases to hold if the assignment is locally altered from x to a non-deterministic assignment to the variable x. A condition edge $$e: a \xrightarrow{q()} b$$

is relevant w.r.t μ iff μ(a)⊨( ) and μ(b)⊨( ). A minimal set of relevant edges corresponding to a path program and a given invariant map forms a set of conflict edges.

Non-deterministic Choice Replacement—Let $C_\pi$ be a set of relevant edges w.r.t a map μ. Furthermore, let us replace each irrelevant assignment edge in $E_\pi$ by a non-deterministic assignment to the same variable and replace each irrelevant condition by to obtain CFG π'. The map μ remains a valid inductive map for the CFG π'.

Returning to the result of local iteration from path-local-repair, the relevant edges for the path π include the edges $$1 \xrightarrow{yp} 2 \text{ and } 2 \xrightarrow{p \ne 0} 3.$$

The repair iteration presented thus far bears certain similarities to the process of counterexample-based abstraction refinement. Repair iteration is carried out using a property proof along a path program, which is analogous to a false counterexample path through the model. However, counter-example refinement refines an abstraction using predicates or facts derived from the false counterexample. On the other hand, no such abstraction can be said to exist naturally in our framework. The repair iteration serves in our framework to identify a relevant set of conflict edges so that path programs visiting these edges need not be considered further. In particular, the SAT formula used to encode path programs is not an abstraction of the program.

Symbolic Execution

As an alternative to abstract interpretation, path programs can be analyzed conservatively using symbolic execution. However, the presence of loops requires that the assignments in the loop be treated conservatively. This is different from standard symbolic execution wherein all loops are traversed for a fixed number of iterations, yielding (at best) an under-approximation rather than an over-approximation of the path program semantics.

Formally, let π be a path program represented by nodes $N_\pi$ and edges $E_\pi$. Let $L_\pi$ be a set of loops that are visited by the path program π. An over-approximate symbolic execution of the path program π consists of a formula $\psi_\pi$ in a suitable first-order theory whose unsatisfiability denotes the infeasibility of the path program π. Such a formula can be derived by simply composing the transition relations along the edges visited by the path program π. Edges belonging to loops in the path program are handled conservatively by ignoring conditions occurring along the edges and abstracting assignments encountered as non-deterministic choice. Finally, if a property n, φ is asserted at the terminal node of the path program π, we treat ¬φ as a condition encountered at the node.

For symbolic execution, let be the logical formula obtained by symbolic execution of the path program with an assertion if as infeasible then any execution of the path program satisfies.

The symbolic execution can be improved by means of simple optimizations such as hoisting loop invariant assignments outside loops. The satisfiability of does not immediately imply the presence of executions that violate. However, if the path slice of w.r.t the property is satisfiable (Cf. Jhala & Majumdhar [18]), then can be shown to contain a violation of the property (provided all loops are guaranteed to terminate).

Recall the path from the program in path-running-example:

$$1 \to 2 \to 3 \to 6 \to \{8, 10\} \to 11 \to 12(\ldots\ 0).$$

Symbolic execution of this program treats the assignment to the variable in the MSCC {8,10} as a non-deteriminstic choice. The result of the symbolic execution is obtained by composing the transition relations of the individual edges as follows:

$$\begin{bmatrix} \ldots : (\ldots = \ldots) \wedge \ldots : (\ldots \ne 0) \wedge \ldots : (\ldots) \\ \wedge \ldots : (\ldots = 0) \wedge \ldots, 12: \ldots \wedge \ldots = 0 \end{bmatrix}$$

The subscripts on the variables occurring in the transitions are derived by computing the SSA-form of the program π or using a use-def chain analysis. Note that $\psi_\pi$ go, is infeasible, indicating that π satisfies the property 12, φ.

The conflict set is determined from the results of the symbolic execution. Let $\psi: \rho_1\hat{}\ldots\hat{}\rho_m$ be an infeasible formula obtained from a path program $\pi$. Furthermore, let $R=\{\rho_{i_1},\ldots,\rho_{i_k}\}$ be an unsatisfiable core for the formula $\psi$ and $C=\{e_{i_1},\ldots,e_{i_k}\}$ be the subset of edges that yield the transitions present in the set R. The set C forms a conflict set for the infeasibility of $\pi$.

Formally, let C be a subset of edges obtained from the unsatisfiability core of $\psi_\pi$ for a path program $\pi$. Let $\pi'$ be obtained from $\pi$ by replacing the transition relations for edges not in C with.

Next, conflicts from symbolic execution is discussed. The path program $\pi'$ continues to satisfy the property n, $\phi$.

As a result, the set C obtained from an infeasible symbolic execution of the path program serves an identical purpose as that obtained through repair iteration following an abstract interpretation proof. Returning to the formula $\psi_\pi$ from symex-ex-1, the unsatisfiable core consists of the transition relations $\{\rho1,2, \rho_{2,3}\}$ along with the property $\phi$. This yields the conflict set C=$\{1\rightarrow2, 2\rightarrow3\}$. The set C is identical to the result of repair iteration from repair-iteration-conflict.

The power of symbolic execution over a conservative abstract interpretation lies in the ability of fast solvers to reason about the feasibility of large formulae in theories such as linear arithmetic or bit-vectors. On the other hand, the over-approximate treatment of loops in the symbolic execution means that properties that depend on loops, or properties occurring inside loops cannot be handled effectively.

In practice, a combination of symbolic execution over non-loop nodes and abstract the loop nodes using the computed invariants is used. Doing so requires the computation of the unsatisfiability core of $\psi_\pi$ in order to identify the necessary loop invariants. These loop invariants are used as the initial map for a repair iteration to yield the set of edges necessary for the invariants that belong to the unsatisfiability core.

Interference.

Given a path $\pi$ leading from $n_0$ to a property $\Psi$: n, $\phi$, a CFG obtained by the nodes and edges in $\pi(N_\pi, E_\pi)$ has been analyzed to obtain a fixed point map $\eta$. Assuming that $\eta$ proved the property in question, a reduced map $\mu$ is obtained which in turn provides a subset $C_\pi \subseteq E_\pi$ of relevant edges for the property.

The set of paths Q is characterized next, leading to n in the original CFG that are also guaranteed to satisfy the property $\Psi$. Conditions are formulated for paths $\xi$ from $n_0$ on to n that traverse all the edges in $C_\pi$ in order to incorporate the same relevant edges for the property $\Psi$, thus guaranteeing that $\xi$ also satisfies the property $\Psi$. Potentially interfering assignments in the CFG are addressed next.

Figure 4B:
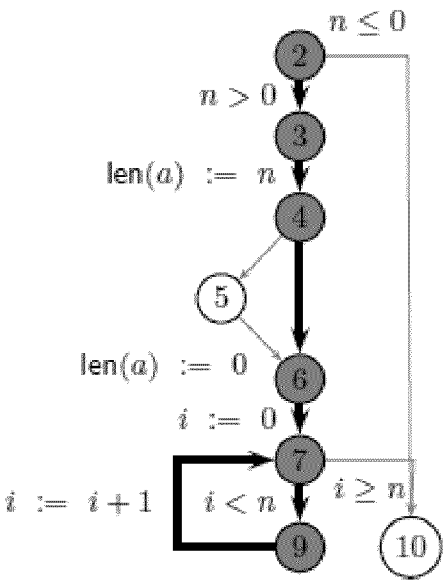
FIG. 4B shows an example program and its CFG representation.

FIG. 4B shows an example program and its CFG representation. A path program $\pi$ leading to the property 9, $i<$(a) is highlighted by solid coloured lines. FIG. 4B shows an example program with its CFG as constructed by F-Soft. Dynamic allocation and assignment to the pointer a is modelled by a variable (a) tracking its allocated length. The program assertion 9, $i<$(a) is added to check for possible overflows due to the access a[i] in line 8. The nodes and edges of the chosen path program $\pi$ are highlighted in the figure.

The property is easily verified over the path $\pi$ using an abstract interpretation over the octagonal domain. The relevant invariants at node 9 that enable us to verify this property are $i<n\hat{}n=$(a). Furthermore, the relevant edges in the conflict set $C_\pi$ are $$e_1: 3 \xrightarrow{(a)n} 4, e_2: 7 \xrightarrow{i<n} 9, e_3: 6 \xrightarrow{i0} 7 \text{ and } e_4: 9 \xrightarrow{ii+1} 7.$$

Consider the path $\xi$ that differs from $\pi$ in the edge $4\rightarrow7$.

$$\xi: 2 \xrightarrow{n>0} 3 \xrightarrow{(a)n} 4 \rightarrow 5 \xrightarrow{(a)0} 6 \xrightarrow{i0} 7, 9$$

The path $\xi$ also traverses all the edges in $C_\pi$. Nevertheless, $\xi$ leads to a property violation whereas $\pi$ does not. The key reason is that the assignment (a)0 in the edge $5\rightarrow6$ interferes with the conflict set $C_\pi$.

The definition for interference is discussed next. Let $C_\pi$ be a conflict set corresponding to a path program $\pi$ in the CFG. An edge $e \notin E_\pi$ interferes with $C_\pi$ iff there exist a pair of edges $e_1, e_2 \in C_\pi$ forming a use-def chain such that $e_1$: assigns (x) and $e_2$: uses (x). Furthermore, e assigns the variable x and there exists a syntactic path $\xi$ that visits e between $e_1$ and $e_2$. $e_2$ may also represent the monitor edge for the property under consideration if it depends on the variable x.

Returning to the previous example, the edge $3\rightarrow4$ and the monitor for the property 9, $i<$(a) form a use-def chain that is interfered by the edge $5\rightarrow6$, which re-assigns the variable (a).

In order to find all interfering edges, pairs of edges $e_1, e_2$ in the conflict set (including the property) such that $e_1$ assigns some variable x and $e_2$ uses the variable are considered. An edge e in the CFG that is (a) forward reachable from the sink of $e_1$, (b) backward reachable from the source node of $e_2$ and (c) assigns to the variable x is a potential interfering edge. Such edges can be found simply through a control flow analysis of the CFG. Let $I_\pi$ be a (super-)set of potentially interfering edges for a conflict set $C_\pi$.

If $\pi$ is proven not to violate a given property $\Psi$:n, $\phi$, then any path program $\xi$ from $n_0$ to n that visits all the nodes in $C_\pi$ and none of the nodes in $I_\pi$ also satisfies the property.

Thus the conflict set $C_\pi$ and the interfering nodes $I_\pi$ describe the set Q of paths that do not violate the property $\Psi$, provided $\pi$ is shown to satisfy $\Psi$.

Handling Violations

If for a given path program $\pi$ the fixed point obtained by abstract interpretation does not prove a given program assertion n, $\phi$ then it follows that a violation of the property may exist. However, the incompleteness of the abstract domain does not allow us to be certain of a property violation. In practice, static analysis tools raise warnings upon discovering potential violations. Our tool can also provide a similar warning. Furthermore, the path $\pi$ itself can provide a good trace to aid the user diagnosis.

The analysis expands on a potential warning to include other paths related to the warning by using a standard path-slicing algorithm along the lines of previous work of Jhala and Majumdar. The path slicing algorithm starts from the set of variables relevant to the property and proceeds to mark each edge in the path $\pi$ as being relevant with respect to the reachability of the node n and the values of the variables involved in the property $\phi$.

The system applies path slicing techniques as described by Jhala and Majumdar to minimize potential error traces. Path slicing returns a subsequence of a path whose infeasibility implies the infeasibility for a path and whose feasibility implies the feasibility of a variant path, but it is only applied to minimize potentially feasible paths, not infeasible paths.

This is due to the fact that the support sets can be shown to correspond to subsequences that are at least as small as those returned by a path slicing algorithm.

As a result of path slicing, a set $S_\pi \subset E_\pi$ of edges relevant to the property and a set $I_\pi$ of interfering edges that may interfere with the use-def chains in $S_\pi$ are obtained. According to Jhala & Majumdhar, if $S_\pi$, $I_\pi$ be as computed by the path slicing technique, any path $\xi$ that visits all the nodes in $S_\pi$ and none of the nodes in $I_\pi$, $\xi$ violates the property n, $\phi$ iff $\pi$ does.

Encoding Path Programs

A Boolean SAT-based encoding of all the path programs in a given CFG starting from the initial node and reaching a given target node n is discussed next. The encoding consists of a propositional variable $X_e$ corresponding to the occurrence of each edge e in a path program. Let G: (N, E) represent the original CFG and $G_D$: ($N_D$, $E_D$) represent its MSCC decomposition.

Let outgoing(m) denote the set of outgoing edges in $E_D$ for a node m∈$N_D$. Similarly incoming(m) denotes the set of incoming edges. source(e) and target(e) denote the source and target nodes of an edge e∈$E_D$. Finally, for a subset of edges $E_s$, let exactlyOne($E_s$) stand for the constraint the exactly one edge from $E_s$ occurs in a path. This is represented by the Boolean formula:

$$\bigvee_{e \in E_s} X_e \wedge \bigwedge_{e,f \in E_s, e \neq f} X_e \Rightarrow \neg X_f$$

The following constraints characterize the set of all path programs:
The initial node and property node must be visited.
  exactlyOne(outgoing($n_0$)) ∧ exactlyOne(incoming(n))
For each edge e∈$E_D$ s.t. e∉outgoing($n_0$), exactly one of its predecessors (in $G_D$) is visited.
  $X_e \Rightarrow$ exactlyOne(incoming(source(e)))
For each edge e∈$E_D$ s.t. e∉incoming(n), exactly one of its successors (in $G_D$) is visited:
  $X_e \Rightarrow$ exactlyOne(incoming(target(e)))

As a result of the encoding, a Boolean formula Λ(G) over the set of propositional variables $\{X_e | e \in E_D\}$ is obtained. For each solution, a path through the graph $G_D$ starting at $n_0$ and reaching the MSCC corresponding to the node n is obtained. Such a path can be translated into a path program over the original CFG. The enumeration of all the path programs in the CFG can be treated as an all-sat enumeration of the solutions to the formula Λ(G).

The elimination of conflict sets and the expansion of alarms by side path analysis can all be incorporated into the SAT formula by means of a blocking clause.

Let $C_\pi$, $I_\pi$ represent the conflict and interfering edges corresponding to a path program π that satisfies a given property. Any path that visits all the edges in $C_\pi$ and none of the edges in $I_\pi$ is also guaranteed to satisfy the property and need not be considered further. This is incorporated in the enumeration by adding the following blocking clause:

$$\bigvee_{e \in C_\pi} \neg X_e \vee \bigvee_{f \in I_\pi} X_f$$

The blocking clause above encodes paths that either do not visit some node of $C_\pi$ or do visit some node of $I_\pi$. By adding such a blocking clause to the SAT formula, the enumeration to such paths is restricted in the future. The sets $S_\pi$, $I_\pi$ obtained as a result of slicing a violation are also treated similarly.

In one embodiment, the analysis technique based on path-sensitive analysis has been implemented as a part of the F-Soft program verification platform for C and C++ programs. F-Soft implements utilities for parsing C programs, constructing memory models, instrumenting checks for properties such as buffer overflows, string API usage, NULL pointer dereferences, user-defined type-state properties and so on. The initial model constructed by the front-end is flattened by expanding compound types into simple types. Pointers are provided addresses and indirections to pointers are expanded based on the results of a flow-insensitive point-to analysis. This model is further analyzed using a series of analyses such as constant folding, interval analysis and other numerical domain analyses based on domains such as octagons, symbolic ranges and polyhedra. The static analyzer is flow and context-sensitive. Context sensitivity is achieved in our static analyzer by inlining all the function calls and returns, treating them as go to statements. While this entails a large blowup in the model size, the size of the model has been found to remain within scalability limits of our static analysis algorithms. Recursion is handled unrolling recursive calls to a fixed depth and treating calls beyond this depth context-insensitively. After each analysis stage, the properties proved by the stage are removed from the model. The model is simplified by repeatedly slicing and constant-folding to reduce the model size.

Pseudo-code for this implementation is as follows:

```
Input: Π : Program CFG, ψ : (n, φ) assertion to be verified.
Result: Alarms : Set of possible path programs leading to violation.
    begin
1       Compute MSCC decomposition G_D.
2       Λ := satEncodePaths(G_D, n_0, n). /* Compute SAT encoding of all paths
        in G_D from n_0 to n */
3       while (Λ is satisfiable) do
4           π := solveAndObtainPath(Λ)
5           η := AbstractInterpret(π, n, φ)            /* Use static analysis over π */
6           if (η(n) |= φ) then                         /* π cannot lead to violation */
7               (C_x, I_x) := extractConflictSets(π, η)   /* Compute conflict paths */
8               Λ := Λ ∧ blockingClause(C_x, I_x)
            else                                        /* π may lead to violation  */
                /* Compute related violations using path slicing           */
9               S_x, I_x := extractPathSlice(π, n, φ)
10              Alarms := Alarms ∪ S_x
11              Λ := Λ ∧ blockingClause(S_x, I_x)

end
```

The initial SAT formula $\phi_0$ is formed by traversing the inlined CFG at the start of the analysis. For each property in turn, the analysis produces path programs from the solution to the SAT formula. The path programs are first analyzed using symbolic execution. If the result of the symbolic execution establishes the property, the conflict edges are obtained using an unsatisfiability core computation. Currently, the Yices SMT solver is used to perform the symbolic execution over the theory of linear arithmetic. If the symbolic execution fails and furthermore that path program consists of loops, an abstract interpretation is performed over the path program. The resulting fixed point is minimized with respect to the property using the repair iteration process described previously.

Currently, support set and unsatisfiability core computation is performed using the SMT solver Yices. Since the Yices API lacks direct support for unsat-core generation, one implementation uses repeated satisfiability checks by removing the conjuncts in the antecedent in order to compute unsatisfiability cores. If a path program cannot be proved using symbolic execution or abstract interpretation, it is sliced and presented as a potential witness. Currently, this implementation stops analyzing a given property upon encountering a potential witness, moving on to the next property to be analyzed.

An application of the system to path-sensitive property verification for C/C++ programs using the F-Soft program verification framework has been done. Tests show that the combination of powerful numerical domain abstract interpretation techniques with SAT-based enumeration can prove properties and indicate potential violations in the large.

Figure 5:
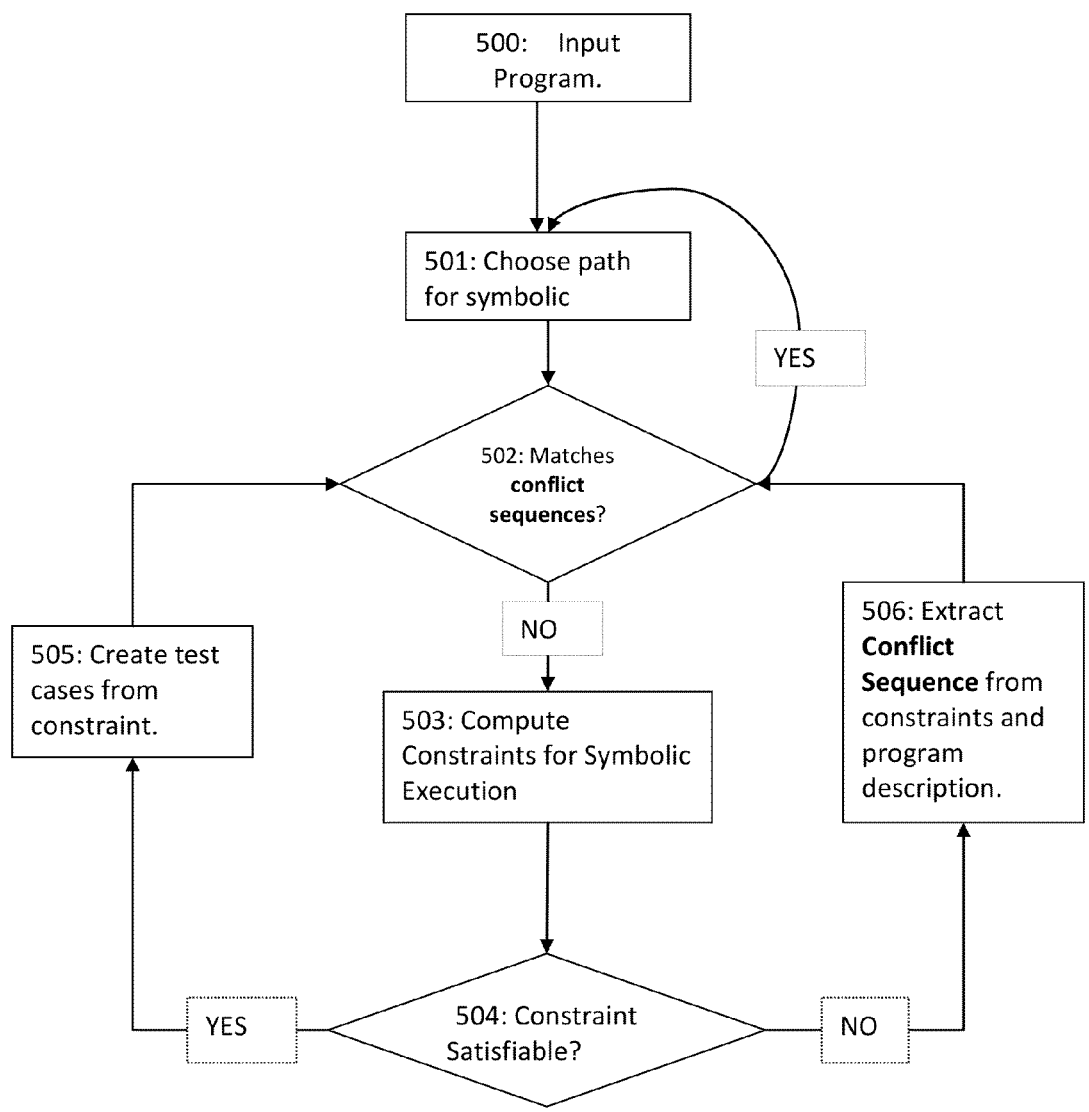
FIG. 5 shows an exemplary process to learn and utilize conflict sequences derived from unsatisfiable cores, which are obtained from infeasible symbolic executions.

FIG. 5 shows an exemplary process to learn and utilize conflict sequences derived from unsatisfiable cores, which are obtained from infeasible symbolic executions. Symbolic execution techniques explore program paths using a constraint solver to generate enabling constraints for the chosen program paths. Satisfiable constraints, corresponding to feasible program paths, may be used to generate tests. On the other hand, unsatisfiable constraints that correspond to infeasible paths are frequently ignored by existing approaches.

Given an unsatisfiable set of constraints, its unsatisfiable core is used to infer a sequence of conflicting program edges which may not appear together in any execution. These derived conflict sequences provide non-trivial structural invariants of the program.

The process of FIG. 5 extracts an unsatisfiable core for each infeasible symbolic execution. An unsatisfiable core is a subset of the original set of constraints that is itself unsatisfiable. From an unsatisfiable core, the process extracts a sub-sequence of conflicting program statements that cannot be traversed by any feasible path through the program. These statements form a compact "reason" for the infeasibility of the program path. Many different infeasible paths through the program may share the same conflict sequence. Thus, the conflict sequences may be used to improve the efficiency of the symbolic execution algorithm itself by avoiding expensive symbolic execution and satisfiability checks over paths that match previously computed conflict sequences.

Referring now to FIG. 5, the process receives as input a program for which test cases are generated in 500. The process selects a path for symbolic execution in block 501. The process chooses paths through the program using a predetermined heuristic for this purpose and symbolically executes them in block 504. In block 502, the process checks before each constraint computation in block 503 whether the chosen path matches a conflict sequence derived earlier. If a match is obtained, the process loops back to block 501 to process the next path and an expensive satisfiability check is avoided since the chosen path is guaranteed to be infeasible as well.

If the symbolic execution is satisfiable in block 504, then the execution uses the satisfiable solution to extract tests for the path in block 505. If the execution constraint is unsatisfiable then that path is no longer explored, the process extracts the conflict sequence from constraints and program description in block 506. The process computes conflict sets (sequences) from unsatisfiable constraints determined in block 504. This consists of computing an unsatisfiable core from the constraints computed by the symbolic execution algorithm and then mapping the core back to the nodes/edges in the CFG.

By using abstract interpretation techniques, the process of FIG. 5 extends these unsatisfiable cores to prove the infeasibility of paths that vary in the number of loop iterations. Together, these infeasible path segments improve symbolic execution techniques by avoiding expensive satisfiability checks for paths that match a previously derived conflict sequence.

Figure 6:
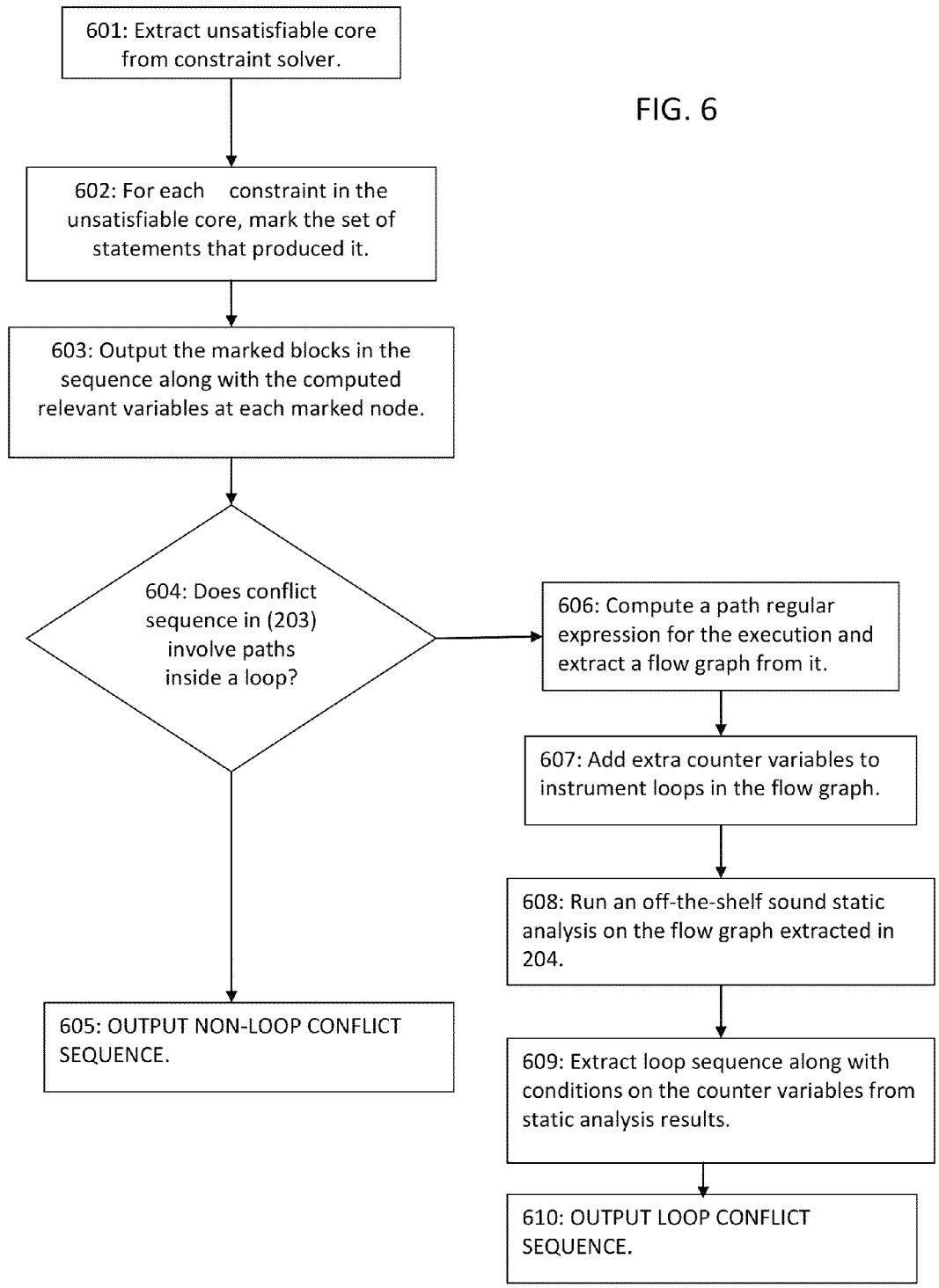
FIG. 6 shows in more detail an exemplary process in FIG. 5 that extracts the conflict sequence from constraints and program description.

FIG. 6 shows the operation of block 506 in more details. First, the process of FIG. 6 extracts unsatisfiable core from a constrained solver in block 601. Next, for each constraint in the unsatisfiable core, the process marks the set of statements that produced the constraint in block 602. The process outputs the marked blocks in the sequence along with relevant variables at each marked note in block 603. The process checks in block 604 whether the conflict sequence in block 603 involve paths inside a loop. If not, the process outputs a non-loop conflict sequence in block 605. Alternatively, if the conflict sequence is inside a loop, the process computes a path regular expression for the execution and extracts a flow graph from the conflict sequence in block 606. Next, the process adds extra counter variables to instrument loops in the flow graph in block 607. Next, in block 608, the process runs a sound static analysis on the flow graph extracted in block 604. The process then extracts the loop sequence along with conditions on the counter variables from the static analysis results in step 609. The process then outputs a loop conflict sequence in block 210.

The conflict sequences are quite compact in practice. Further, they are shared by many different paths through the program. However, conflict sequences frequently contain repeated instances of statements inside loops in the program. This is especially true of loops whose bodies contain conditional branches. Frequently, such branches handle special iterations of the loop. In these situations, the conflict sequences obtained are specific to the actual number of loop iterations. Therefore, a conflict obtained from an execution that iterates a loop m times cannot prove the infeasibility of paths that traverse loops for $n \neq m$ iterations. This results in numerous, long conflict sequences that are not useful in proving infeasibility of other paths. In order to treat this common phenomenon, the process of FIG. 6 uses a path-based abstract interpretation technique to reason about the feasibility of path regular expressions. Path regular expressions capture the effect of iterating through the loops in the path arbitrarily many times. This is similar, in principle, to the path invariant approach used to refine predicate abstractions. Using abstract interpretation and widening over off-the-shelf abstract domains allows us to roll-up loops and reason about paths that iterate through them arbitrarily many time. As a result, the process obtains compact loop conflicts that match a large number of infeasible paths through a CFG.

The conflict sequences obtained using the processes of FIGS. 1 and 2 can avoid unnecessary symbolic execution. Furthermore, they can also be used as invariant facts about the overall program behaviour. The information so obtained can be used to improve static analysis by avoiding data-flow contributions over program paths that traverse these infeasible segments. The enhancement of symbolic execution with unsatisfiable cores is independent of the actual strategy for traversing the paths in the program.

The system may be implemented in hardware, firmware or software, or a combination of the three. Preferably the invention is implemented in a computer program executed on a programmable computer having a processor, a data storage system, volatile and non-volatile memory and/or storage elements, at least one input device such as a keyboard and at least one output device such as a display.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to verify a program, comprising:
    representing a program in a model comprising node representing potential points in execution of the program;
    performing constant folding, interval analysis and numerical domain analyses on a model of the program using a processor;
    inlining function calls and returns as goto statements to achieve context sensitivity; and
    after each analysis stage, removing properties proved by the analysis stage from the model, and repeatedly slicing and constant-folding to reduce model size;
    symbolically enumerating path programs, each path program comprising a syntactic path between a start node in the program and a second node in the program, wherein the second node represents a potential point in execution;
    verifying each path program to determine correctness with respect to a property associated with the second node;
    determining a conflict set from the path program if proven correct;
    and using the conflict set to avoid enumerating related path programs that are correct.

2. The method of claim 1, wherein symbolic enumeration of path programs is performed by enumerating solutions to constraints that represent one or more control paths in a program.

3. The method of claim 2, wherein control paths are enumerated over maximal strongly connected components in the control flow graph of a program.

4. The method of claim 2, wherein the control paths are bounded to a predetermined depth, comprising enumerating over a control flow graph of the program.

5. The method of claim 2, wherein a SAT-solver is used to enumerate over control paths.

6. The method of claim 1, comprising verifying a path program using abstract interpretation.

7. The method of claim 1, comprising verifying a path program using symbolic execution.

8. The method of claim 1, wherein the conflict set determination comprises determining a set of sufficient invariants to prove correctness, and identifying conditions to preserve sufficient invariants along other path programs.

9. The method of claim 8, comprising deriving a set of sufficient invariants by iterative repairing invariants at one or more control locations based on local supporting sets.

10. The method of claim 1, wherein the conflict set determination comprises identifying an unsatisfiable core of constraints sufficient to show correctness of the path program, and identifying conditions to preserve the constraints along other control paths.

11. The method of claim 10, wherein a Satisfiability Modulo Theory (SMT) solver is used to verify a path program, comprising determining an unsatisfiable core if the path program is correct.

12. The method of claim 1, wherein conflict sets are used to generate blocking constraints for control paths that are also proved correct and need not be enumerated.

13. The method of claim 1, wherein the conflict sets are used to match against other control paths, and if a match is found, to avoid verifying the associated path program.

14. The method of claim 1, comprising generating warnings for the path programs not proven correct.

15. The method of claim 1, comprising generating a program with path programs not proven correct for subsequent verification.

16. A method to verify a program, comprising:
    performing constant folding, interval analysis and numerical domain analyses on a model of the program using a processor;
    inlining function calls and returns as goto statements to achieve context sensitivity; and
    after each analysis stage, removing properties proved by the analysis stage from the model, and repeatedly slicing and constant-folding to reduce model size;
    enumerating depth bounded path programs, each path program comprising a syntactic path between a start node in the program and a second node in the program, wherein the second node represents a potential point in execution;
    verifying each path program to determine correctness with respect to a property associated with the second node;
    determining a conflict set from the path program if proven correct; and
    using the conflict set to avoid verification of related path programs that are also correct.

17. The method of claim 16, comprising enumerating control paths over the control flow graph of the program.

18. The method of claim 17, comprising using a concrete test execution to guide the control path enumeration.

19. The method of claim 16, comprising verifying a path program using abstract interpretation.

20. The method of claim 16, comprising verifying a path program using symbolic execution.

21. The method of claim 16, wherein the conflict set determination comprises determining a set of sufficient invariants that can prove the correctness property, and identifying conditions to preserve sufficient invariants along other control paths.

22. The method of claim 21, where a set of sufficient invariants is derived by iterative repairing invariants at one or more control locations based on local supporting sets.

23. The method of claim 16, wherein the conflict set determination comprises identifying an unsatisfiable core of constraints sufficient to show correctness of the path program, and identifying conditions to preserve the constraints along other control paths.

24. The method of claim 23, wherein a Satisfiability Modulo Theory (SMT) solver is used to verify a path program, and its unsatisfiable core is determined if the path program is correct.

25. The method of claim 16, wherein conflict sets involving a loop are generalized to apply to an arbitrary number of iterations of the loop.

26. The method of claim 16, wherein the conflict sets are used to match against other control paths, and if a match is found, to avoid verifying the associated path program.

* * * * *